(12) United States Patent
Harmon et al.

(10) Patent No.: US 11,589,499 B2
(45) Date of Patent: Feb. 28, 2023

(54) QUICK DISCONNECT CONVEYANCE TUBES

(71) Applicant: Deere & Company, Moline, IL (US)

(72) Inventors: Andrew W. Harmon, Davenport, IA (US); Kyle D. Parks, Orion, IL (US); Jesus Landinez, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 871 days.

(21) Appl. No.: 16/411,729

(22) Filed: May 14, 2019

(65) Prior Publication Data

US 2020/0359553 A1    Nov. 19, 2020

(51) Int. Cl.
*F16L 37/248*    (2006.01)
*A01C 7/08*    (2006.01)

(52) U.S. Cl.
CPC ............ *A01C 7/082* (2013.01); *F16L 37/248* (2013.01)

(58) Field of Classification Search
CPC ..... F16L 37/105; F16L 37/113; F16L 37/107; F16L 37/24; F16L 37/244; F16L 37/248; F16L 37/252; F16L 15/06; F16L 33/223; F16L 33/224
USPC ......... 285/361, 402, 34, 391, 392, 330, 248, 285/249
See application file for complete search history.

(56) References Cited

U.S. PATENT DOCUMENTS 193,166 A * 7/1877 Littlejohn
418,225 A * 12/1889 Rice ..................... F16L 37/0925
285/341

(Continued)

FOREIGN PATENT DOCUMENTS

CN    1596864 A    3/2005
EP    1138307 A2    10/2001

(Continued)

OTHER PUBLICATIONS

Partial European Search Report and Written Opinion issued in European Patent Application No. 20170245.3, dated Oct. 15, 2020, in 29 pages.

(Continued)

*Primary Examiner* — Aaron M Dunwoody
(74) *Attorney, Agent, or Firm* — Taft Stettinius & Hollister LLP; Stephen F. Rost

(57) ABSTRACT

A fluid line connection for a pneumatic distribution system for an agricultural air seeder includes a female connector having an inside diameter with a groove and a male connector configured for internal assembly with the female connector. The male connector has an external tab that engages the groove to retain the male connector to the female connector when the female connector is rotatingly assembled with the male connector. The female connector is removed by rotating and disassembling from the male connector to access a conveyance tube or manifold for servicing these parts. A sealing member is assembled between the male and female connectors to form a fluid seal. A primary tube can be assembled between two fluid line connections to form a quick connect assembly. A fitting connector and a locking ring are assembled with a fluid line connection to retain a primary tube thereon for an air drill.

13 Claims, 14 Drawing Sheets

(56) References Cited

U.S. PATENT DOCUMENTS

| | | | | |
|---|---|---|---|---|
| 1,033,187 | A | * | 7/1912 | Metzger ................ F16L 37/252 |
| | | | | 285/376 |
| 4,708,370 | A | * | 11/1987 | Todd .................. F16L 25/0045 |
| | | | | 285/361 |
| 6,571,405 | B1 | | 6/2003 | Saputo et al. |
| 9,913,423 | B2 | | 3/2018 | Henry |
| 2005/0050627 | A1 | | 3/2005 | Ayeni et al. |
| 2006/0243179 | A1 | | 11/2006 | Landphair et al. |
| 2007/0192952 | A1 | | 8/2007 | Lau |
| 2012/0200081 | A1 | | 8/2012 | Reznar et al. |
| 2014/0208999 | A1 | | 7/2014 | Henry |

FOREIGN PATENT DOCUMENTS

| | | | |
|---|---|---|---|
| EP | | 1348326 A1 | 10/2003 |
| FR | | 2951902 A1 | 5/2011 |
| WO | WO 2007038222 | A2 | 4/2007 |
| WO | WO 2008/083494 | A1 | 7/2008 |

OTHER PUBLICATIONS

Extended European Search Report and Written Opinion issued in European Patent Application No. 20170245.3, dated Feb. 1, 2021, in 14 pages.

* cited by examiner

QUICK DISCONNECT CONVEYANCE TUBES

FIELD OF THE DISCLOSURE

The present disclosure relates to agricultural air seeders, and in particular, to fluid line connections used with such air seeders.

BACKGROUND OF THE DISCLOSURE

Air seeders are commonly towed by an agricultural tractor, to apply a material such as seed, fertilizer and/or herbicide to a field. An air seeder includes a wheeled air cart which includes one or more frame-mounted tanks for holding material. In the case of multiple tanks, the tanks can be separate tanks, or a single tank with internal compartments. The air cart is typically towed in combination with a tilling implement, such as an air drill, one behind the other, to place the seed and fertilizer under the surface of the soil. Air seeders include a metering system for dispensing material from the tanks and a pneumatic distribution system for delivering the material from the tanks to the soil. A centrifugal fan provides at least one airstream which flows through the pneumatic distribution system. Material is first introduced to the air stream by the metering system at a primary distribution manifold located below the metering system. The tanks of the air seeders are formed with bottom surfaces that slope downward for the granular material to move toward the metering system. Gravity, in combination with the vibrations and movement of the air seeder, act to move the granular material from the perimeter of the tank toward the metering system located at the center of the tank. Material is carried by the air stream through distribution lines to a series of secondary distribution manifolds, which in turn distribute the material through distribution lines to seed boots mounted behind ground openers on the tilling implement so that the product may be evenly delivered to the ground which is tilled by the tilling implement.

For initial hookup of the air seeder, the traction unit is typically backed up to and coupled with the tilling implement, which in turn is backed up to and coupled with the air cart (e.g., by using respective hitch pins or the like, and assuming that the air cart is behind rather than in front of the air drill). All necessary hydraulic lines, air lines, electrical power lines and/or electrical data lines are then connected between the traction unit, tilling implement and air cart.

Regarding air lines, it will be appreciated that it is desirable to provide connections which are quick and easy to connect, while at the same time provide an effective fluid seal. With air seeders becoming ever larger, the number of air lines and thus the number of air line connections between the tilling implement and the air cart correspondingly increases, making the need for quick and easy air line connections even more important. One type of connection for an air line is a hose clamp however hose clamps have several downsides. One downside is that the hose clamps require labor to individually handle and assemble them. Moreover occasionally the air line becomes plugged with seed material and the hose clamp must be removed to enable access to the air line and the plug. Another downside is that during use of the air line, hose clamps are subject to a severe environment leading to corrosion, stress corrosion, cracking, and binding of the lead screw due to high friction under which the hose clamps are employed. Hose clamps also require a special tool to remove the hose clamp from the air line. In some applications the hose lines in which the hose clamps are clamping are prone to air leakage which leads to inefficiency and possible loss of granular product. Other connections include 0-rings to seal the hose lines but these applications are often difficult to install.

Larger air seeders result in more air lines and more air line connections, requiring that the pneumatic distribution system run under a higher operating pressure. This higher operating pressure also mandates that the fluid line connections must be effectively sealed to prevent excess system air leakage. Moreover a larger air seeder results in a larger number of air lines and air line connections thereby requiring more labor to assemble or disassemble and remove the hose clamps which is costly and inefficient use of time.

What is needed in the art is an air seeder with air line connections which are quick and easy to connect, while providing an effective fluid seal.

SUMMARY

The present disclosure may comprise one or more of the following features and combinations thereof.

According to one embodiment of the present disclosure, a fluid line connection for a pneumatic distribution system for an agricultural air seeder, the fluid line connection comprising: a female connector having an inside diameter with a groove; and a male connector configured for internal assembly with the female connector, the male connector having an engagement mechanism configured to engage the groove and retain the male connector to the female connector to form a seal when the female connector is rotatingly assembled with the male connector.

In one embodiment, the groove includes a first groove portion that extends along a longitudinal axis of the female connector to connect with a second groove portion that extends laterally from the first groove portion. In one refinement of this embodiment, the groove includes a third groove portion that extends along the longitudinal axis to connect with the second groove portion.

In one embodiment, the groove includes a locking feature, and the external tab includes a receiver configured to retain the locking feature therein. In one refinement of this embodiment, the external tab includes a ramp groove configured to guide the locking feature into the receiver when the female connector is assembled with the male connector.

In one embodiment, the female connector has an outer surface that includes a plurality of engagement features.

In one embodiment, the engagement mechanism on the male connector is an external tab.

In one embodiment, further comprising: a fitting connector configured to retain a primary tube thereon, the fitting connector configured for assembly with the female connector; and a locking ring configured to attach to the female connector and retain the fitting connector with the female connector. In one refinement of this embodiment, the female connector and the locking ring each include a plurality of threads to threadingly engage each other.

In one embodiment, further comprising: a primary tube having an outside diameter configured to assemble with the inside diameter of the female connector.

In one embodiment, further comprising: a sealing member positioned on an outer surface of the male connector, wherein the sealing member is configured to engage and form a second seal with the inside diameter of the female connector.

In one embodiment, further comprising: wherein the female connector includes a second internal retention mechanism opposite the groove; and a primary tube having an outside engagement mechanism configured to assemble with the second internal retention mechanism of the female connector to fluidly connect the primary tube to the male connector.

According to another embodiment of the present disclosure, a fluid line connection for a pneumatic distribution system for an agricultural air seeder, the fluid line connection comprising: a female connector having an inside diameter has an internal retention mechanism; a male connector configured for assembly with the female connector, the male connector having an external tab configured to engage the internal retention mechanism and retain the male connector to the female connector to form a seal when the male connector is assembled with the female connector; a fitting connector configured to retain a primary tube thereon, a portion of the fitting connector received in the female connector; and a locking ring configured to attach to the female connector and retain the fitting connector with the female connector.

In a further embodiment, the female connector and the locking ring each include a plurality of threads to threadingly engage each other.

In a further embodiment, the internal retention mechanism includes a first groove portion that extends along a longitudinal axis of the female connector to connect with a second groove portion that extends laterally from the first groove portion.

In a further embodiment, the second groove portion includes a locking feature, and the external tab includes a receiver configured to retain the locking feature therein.

According to another embodiment of the present disclosure, a fluid line connection for a pneumatic distribution system for an agricultural air seeder, the fluid line connection comprising: a male connector having a plurality of threads on an exterior surface, the plurality of threads of the male connector configured to engage a plurality of threads on a locking ring to retain the male connector to the locking ring to form a seal; a fitting connector configured to retain a primary tube thereon, the fitting connector having an engagement feature sized to assemble with the locking ring; and a locking ring having a plurality of threads and a receiving portion on an interior surface, the receiving portion configured to receive the engagement feature of the fitting connector therein to retain the fitting connector with the locking ring, and the plurality of threads of the locking ring configured to engage the plurality of threads on the male connector.

In a further embodiment, a length of each of the plurality of threads on the male connector is less than a circumference of the male connector, each of the plurality of threads having a planar portion that extends between a ramp portion and a stop portion, and a length of each of the plurality of threads on the locking ring corresponds to the length of each of the plurality of threads on the male connector.

In a further embodiment, the fitting connector includes a plurality of barbs configured to retain the primary tuber thereon.

In a further embodiment, the fitting connector includes a split end connector having a length sufficient to support the primary tube from bending movement.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference characters indicate corresponding parts throughout the several view. The exemplifications set out herein illustrate embodiments of the invention, and such exemplifications are not to be construed as limiting the scope of the invention in any manner.

DETAILED DESCRIPTION

Figure 1:
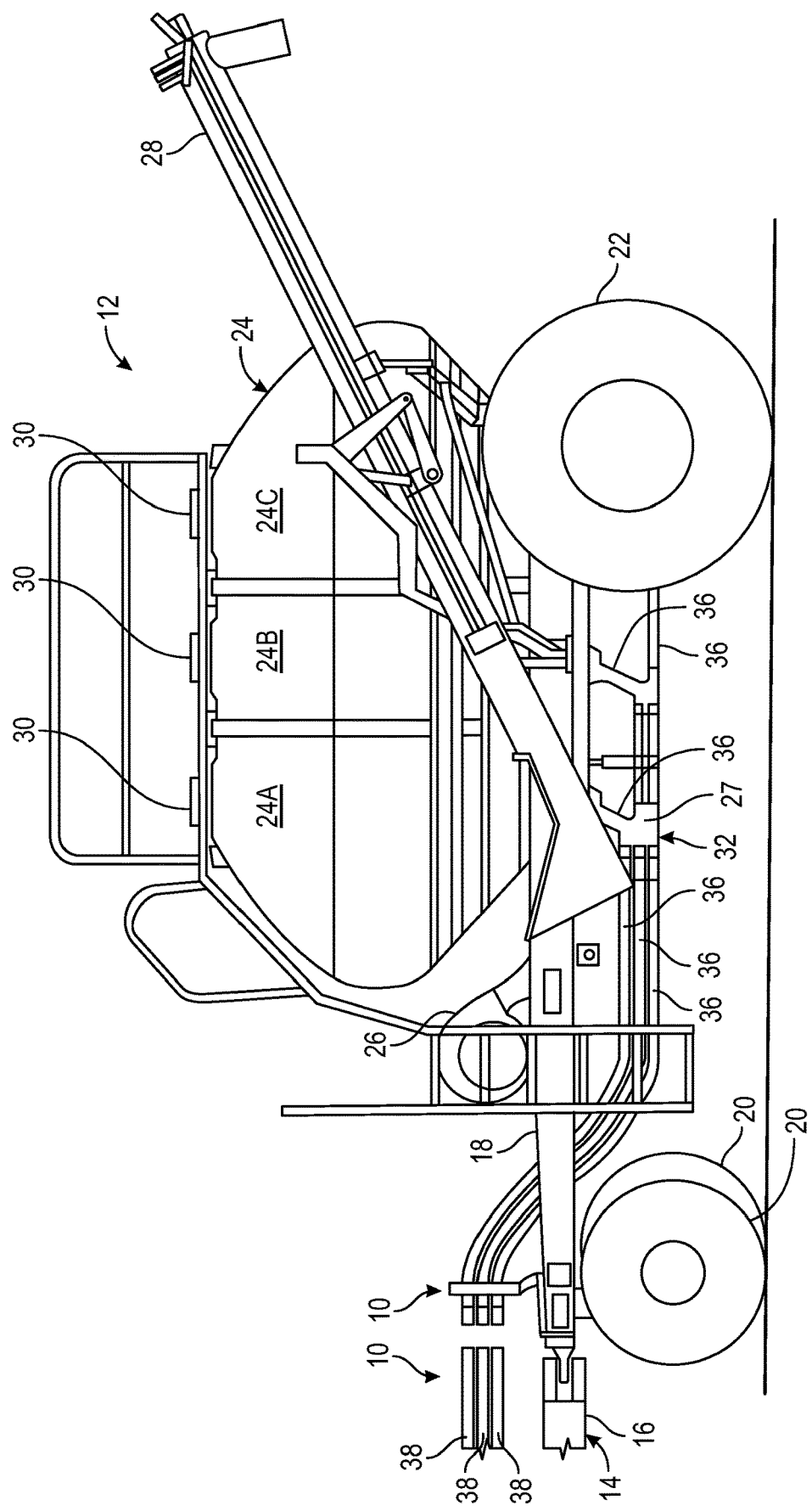
FIG. 1 is a partial side schematic view of an exemplary air seeder.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

FIG. 1 is a partial, side schematic view of an agricultural vehicle, and more particularly an air seeder 10. Air seeder 10 includes an air cart 12 which is towed by a tilling implement 14 with a portion of a rear hitch 16 illustrated in FIG. 1. The tilling implement 14 is an air drill but can be configured differently in other embodiments. In one embodiment, the tilling implement 14 includes a planter and the air cart 12 can be used to refill mini-hoppers on the planter. Air cart 12 can also include a rear hitch allowing air cart 12 to be towed in front of, rather than behind, tilling implement 14.

Air cart 12 includes a frame 18 which in turn includes front wheels 20, rear wheels 22, tank 24, blower 26, and auger 28. In the illustrated form, the tank 24 includes three separate mini-tanks or compartments 24A, 24B, and 24C with each mini-tank or compartment containing a material that is to be deposited or placed into the soil. Some materials include seed, fertilizer, insecticide, and herbicide. Each mini-tank or compartment 24A, 24B, and 24C has a top lid 30 that can be opened to fill the mini-tanks 24A, 24B, and 24C with material and then closed.

Air cart 12 includes a pneumatic distribution system 32 for delivering the air-entrained materials to the soil where trenches or rows have been formed by the tilling implement 14. Pneumatic distribution system 32 includes a metering system 27, blower 26 and a plurality of air lines 36. The metering system 27 dispenses material from the tanks 24A, 24B, and 24C into a manifold 52 and then the manifold 52 directs the product into one of multiple conveyance tubes 50 and from there the product is conveyed to the air seeder 10 via a plurality of air lines 36. Although the illustrated embodiment includes three air lines 36, it is contemplated that a corresponding amount of air lines 36 as conveyance tubes 50 would be implemented.

Figure 2:
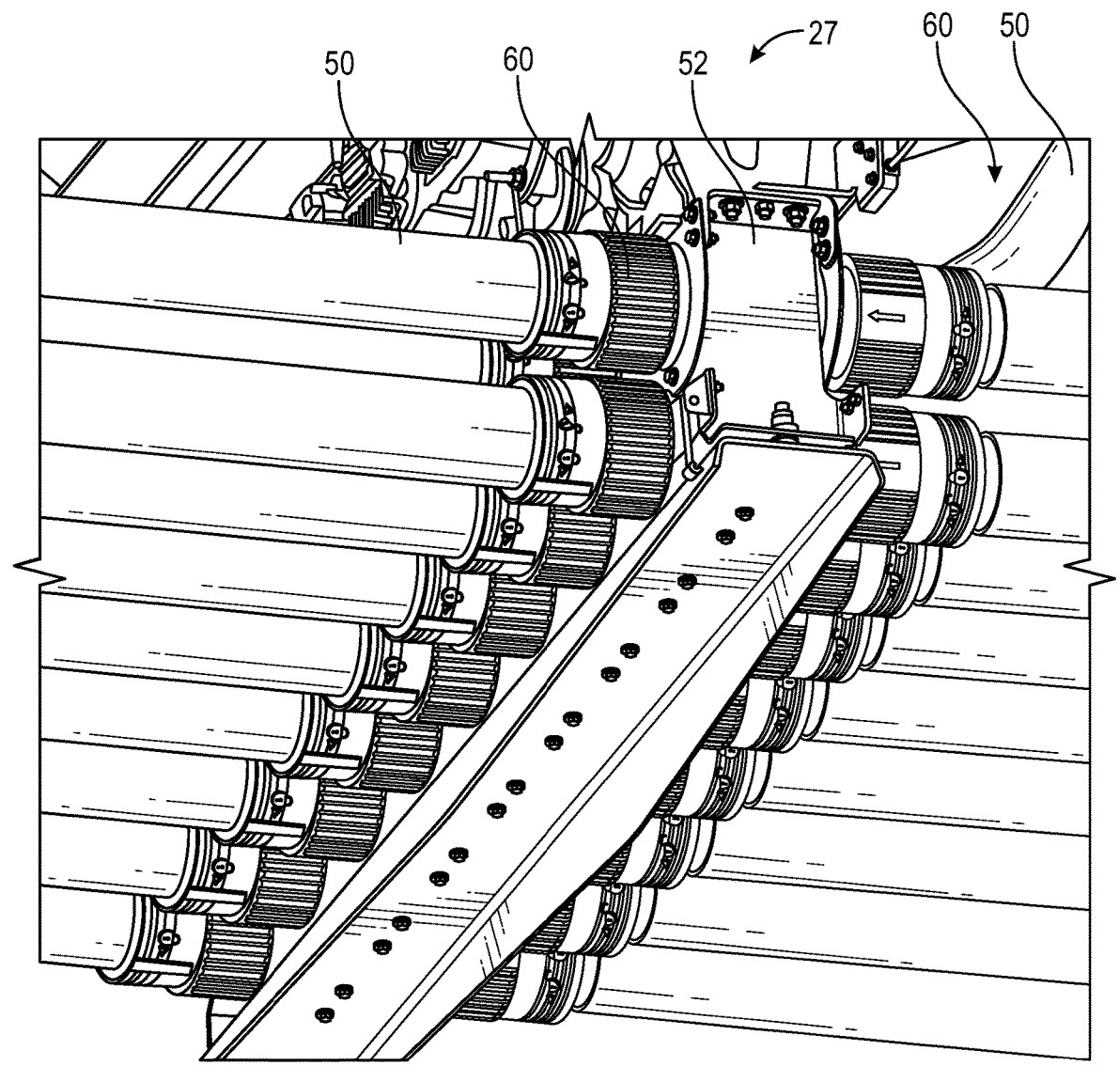
FIG. 2 is a partial side view of an exemplary metering system of the air seeder of FIG. 1.

As illustrated in FIG. 2, the conveyance tubes 50 extend to and terminate at a fluid line connection 60 for coupling with the manifold 52. One form of the fluid line connection 60 includes a female connector 70 and a male connector 72 assembled together. The female connector 70 is assembled onto the male connector 72 such as being rotatingly assembled with the male connector 72. The male connector 72 can be a part of or monolithic with the manifold 52 as illustrated, or can be a separate part that is attached to the manifold 52 in another embodiment.

Figure 3:
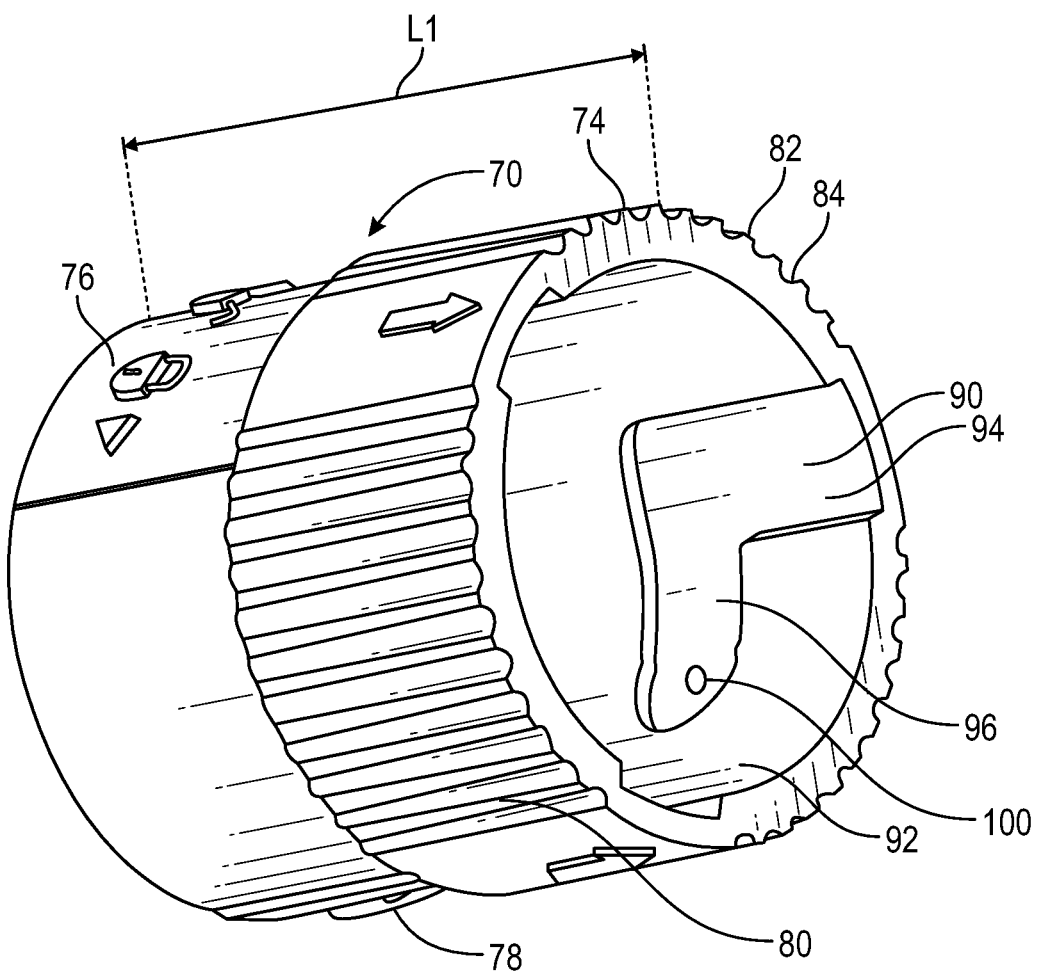
FIG. 3 is a first end perspective view of a female connector for the metering system of FIG. 2.
Figure 4:
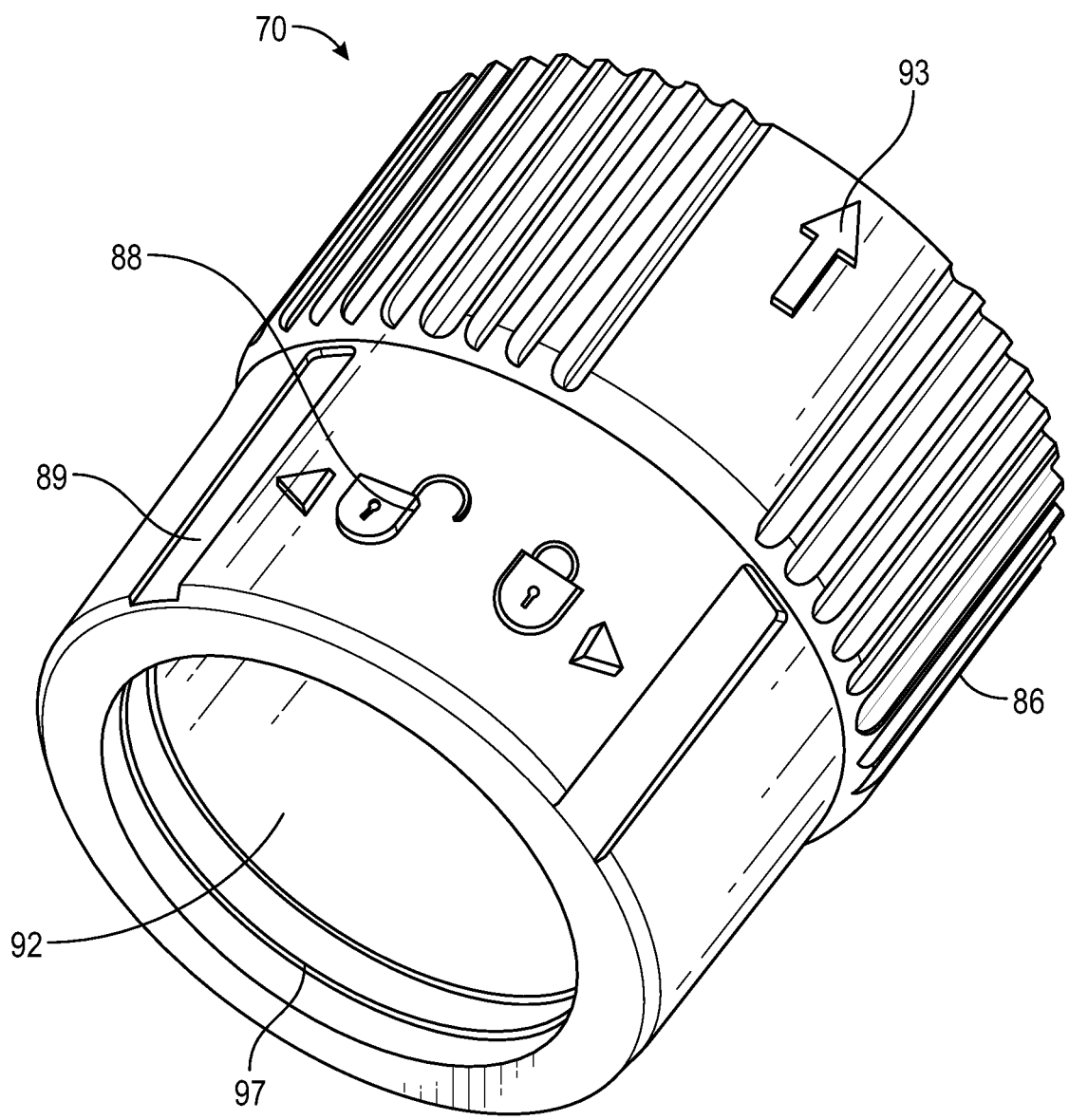
FIG. 4 is a second end perspective view of the female connector of FIG. 3.

Turning now to FIGS. 3 and 4, one form of the female connector 70 is illustrated. The female connector 70 includes a first end 74 opposite a second end 76 and a length L1 that spans between the first and second ends 74 and 76. The female connector 70 has an outer surface 78 that includes a plurality of engagement features 80 near the first end 74. In other forms, the engagement features 80 can be placed near the second end 76 or in the mid-portion of the female connector 70. The plurality of engagement features 80 include a plurality of ridges 82 between a plurality of troughs 84. The outer surface 78 also includes one or more visual indicators 86, 88, and 93. The visual indicator 86 indicates a locked position and a direction in which to rotate the female connector 70 to lock the female connector 70 with the male connector 72. The visual indicator 88 indicates an unlocked position for the female connector 70 and a direction in which to rotate the female connector 70 to unlock and disassemble the female connector 70 from the male connector 72. The visual indicator 93 is an arrow that corresponds with a groove 90 on the inside surface 92 of the female connector 70 wherein the visual indicator 93 indicates where to align the groove 90 with an external tab 91 on the male connector 72 (illustrated in FIG. 5) to more easily assemble the female connector 70 with the male connector 72. The outer surface 78 also includes one or more wrench grooves 89 configured to receive a wrench head in the event the female connector 70 is not easily rotated about the male connector 72.

The female connector 70 has an inside surface 92 with one or more grooves 90 thereon. In the illustrated embodiment, the inside surface 92 includes three grooves 90 thereon. In other form, there may be more or less of the grooves 90 on the inside surface 92. The female connector 70 has an inside diameter that forms and defines the inside surface 92. For the sake of brevity, only one of the grooves 90 will be described as the remaining grooves 90 are the same or substantially similar. The groove 90 includes a first groove portion 94 that extends along a longitudinal axis of the female connector from the first end 74 to connect with a second groove portion 96 that extends at an angle from the first groove portion 94. In the illustrated embodiment, the angle is about 90 degrees such that the second groove portion 96 extends laterally from the first groove portion 94.

In the illustrated form, the groove 90 includes a locking feature 100 that extends away from the surface of the groove 90. The locking feature 100 is positioned in the second groove portion 96 for engagement with the external tab 91 wherein the external tab 91 includes a receiver 102 that is configured to retain the locking feature 100 therein. The external tab 91 also includes a ramp groove 104 configured to guide the locking feature 100 into the receiver 102 when the male connector 72 is assembled with the female connector 70.

The inside surface 92 also includes one or more threads or second internal retention mechanism 97 to threadingly engage with threads 118 on a corresponding end of the male connector 72 or threads on a primary tube 250 having an outside diameter configured to assemble with the inside diameter of the female connector 70.

Figure 5:
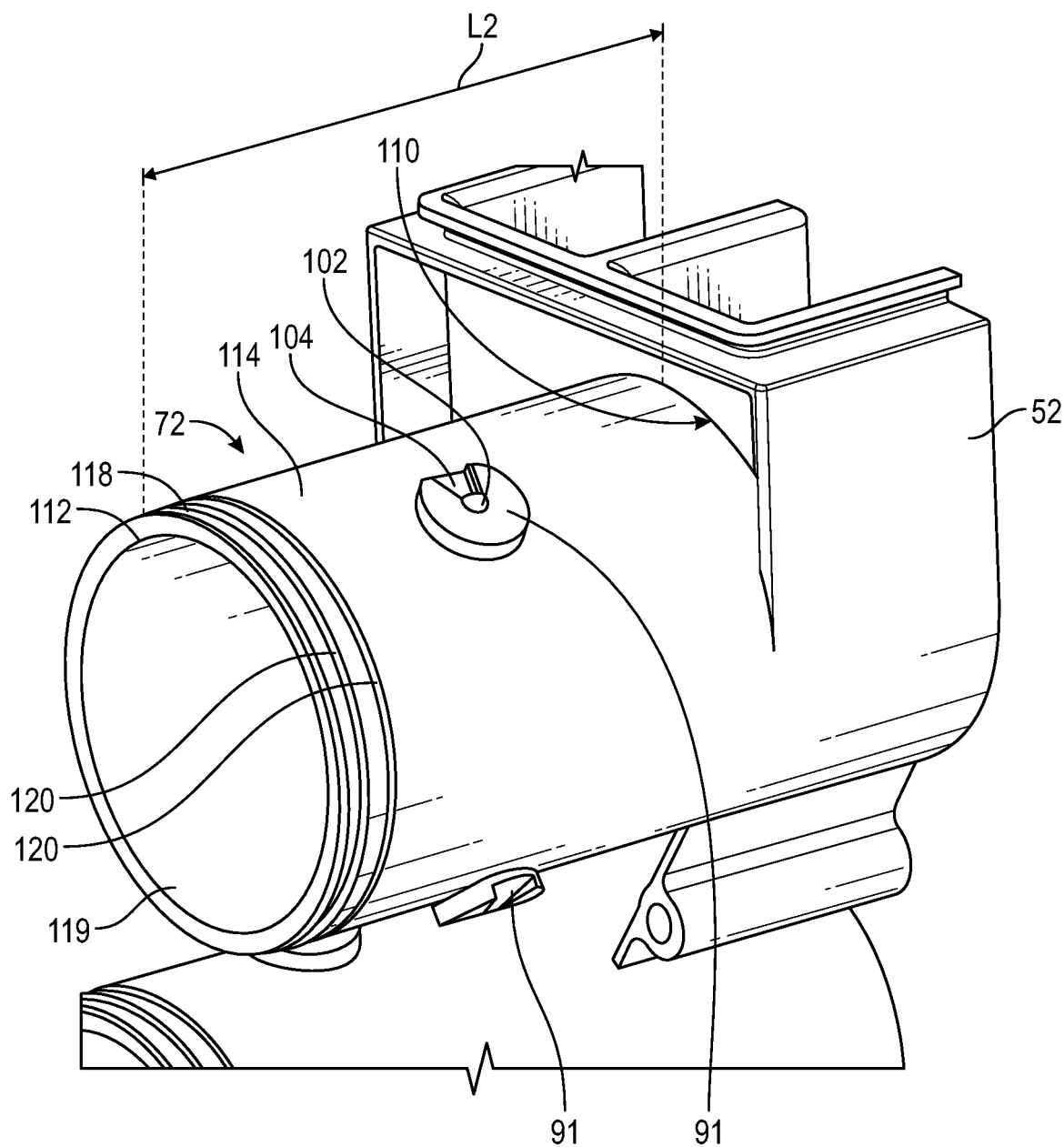
FIG. 5 is a second end perspective view of a male connector of FIG. 3.

The male connector 72 is illustrated in FIG. 5. The male connector 72 is configured for assembly with the female connector 70. The male connector 72 includes a first end 110 opposite a second end 112 and a length L2 that spans between the first and second ends 110 and 112. The male connector 72 has an outside diameter configured to assemble with the inside diameter of the female connector 70. The male connector 72 has an outer surface 114 that includes one or more external tabs 91 near the first end 74. There are a corresponding number of external tabs 91 as there are grooves 90 as the external tabs 91 are configured to engage the grooves 90 to retain the male connector 72 to the female connector 70 to form a seal when the male connector 72 is assembled with the female connector 70. In the illustrated form, there are 3 of the external tabs 91 and 3 of the grooves 90. The external tabs 91 are sized and shaped to slide along the first groove portion 90 as the first end 74 of the female connector 70 is pushed onto the second end 112 of the male connector 72. As the female connector 70 is rotated about the male connector 72, the external tab 91 slides from the first groove portion 90 along the second groove portion 96.

As discussed above, the external tab 91 includes the receiver 102 that is configured to retain the locking feature 100 therein of the female connector 70. In the illustrated form, the receiver 102 is circular in shape but may be configured differently in other forms. The external tab 91 also includes a ramp groove 104 configured to guide the locking feature 100 into the receiver 102 when the male connector 72 is assembled with the female connector 70.

The male connector 72 also includes a plurality of threads 118 at or near the second end 112 wherein the plurality of threads 118 are sized to engage with the plurality of threads 97 on the inside surface 92 of the female connector 70. The male connector 72 includes an inside surface 119 having an inside diameter for air flow or product flow.

In one form, one or more O rings or other types of sealing members 120 are positioned on the plurality of threads 118 for engaging the inside surface 92 of the female connector 70 to form a seal to retain fluid pressure and material. Other types of sealing members 120 can include triple lip or wiper seals, to name a few. One of ordinary skill in the art would appreciate that other types of sealing members not specifically mentioned can be used as well.

Figure 6:
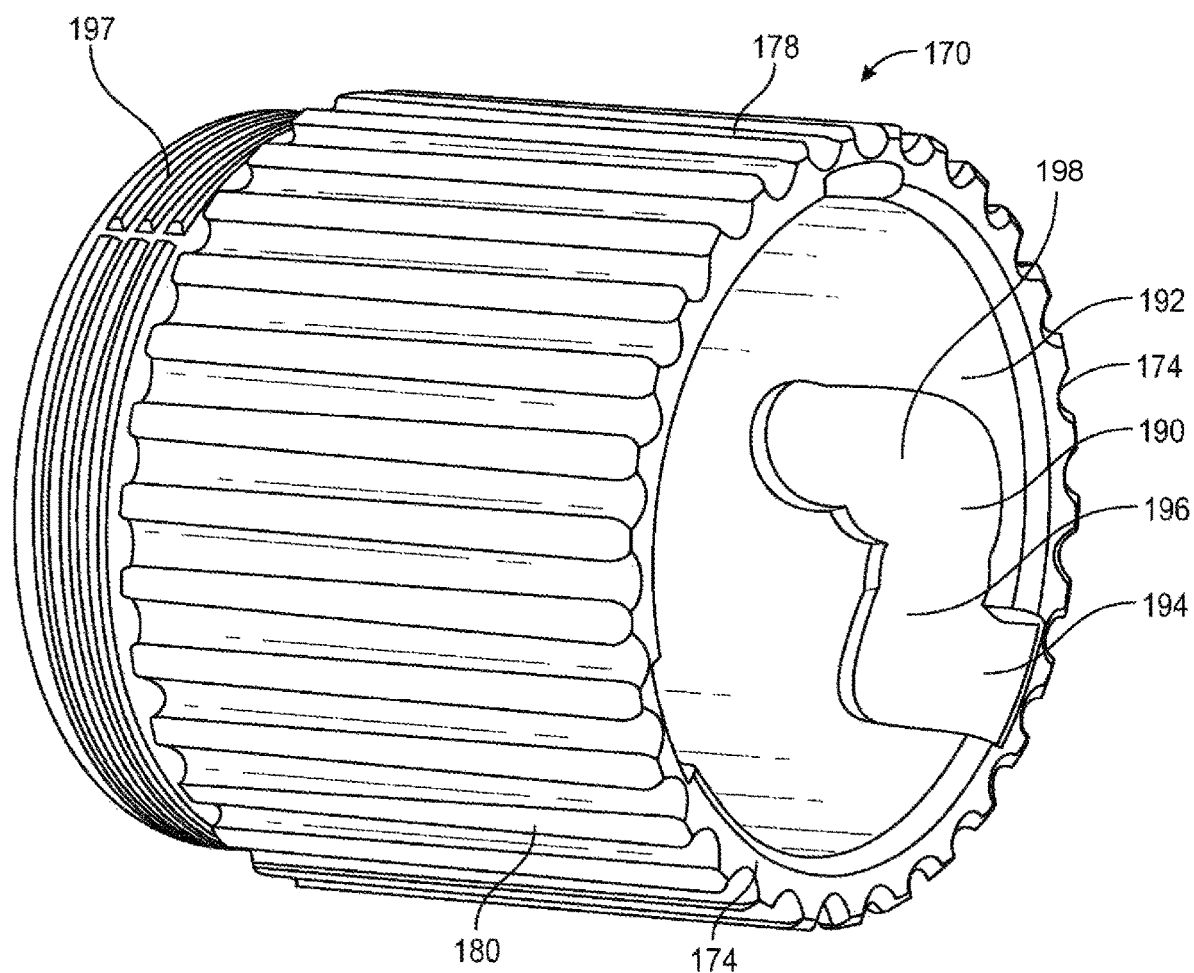
FIG. 6 is another form of a female connector for the metering system of FIG. 2.

Turning now to FIG. 6, another form of a female connector 170 is illustrated. Female connector 170 is similar to female connector 70 in many aspects, unless noted otherwise. The female connector 170 has an outer surface 178 that includes a plurality of engagement features 180 near a first end 174 that are similar to engagement features 80. The outer surface 178 also includes a plurality of threads 197 that are similar to threads 97. The plurality of threads 197 are configured to threadingly engage a locking ring, described below.

Female connector 170 has an inside surface 192 with one or more grooves 190 thereon. In the illustrated embodiment, the inside surface 192 includes three grooves 190 thereon. In other forms, there may be more or less of the grooves 190 on the inside surface 192. The groove 190 is very similar to the groove 90. For the sake of brevity, only one of the grooves 190 will be described as the remaining grooves 190 are the same or substantially similar. The groove 190 includes a first groove portion 194 that extends along a longitudinal axis of the female connector 170 from a first end 174 to connect with a second groove portion 196 that extends at an angle from the first groove portion 194. In the illustrated embodiment, the angle is about 90 degrees such that the second groove portion 196 extends laterally from the first groove portion 194. The groove 190 includes a third groove portion 198 that extends along the longitudinal axis to connect with the second groove portion 196.

Figure 7:
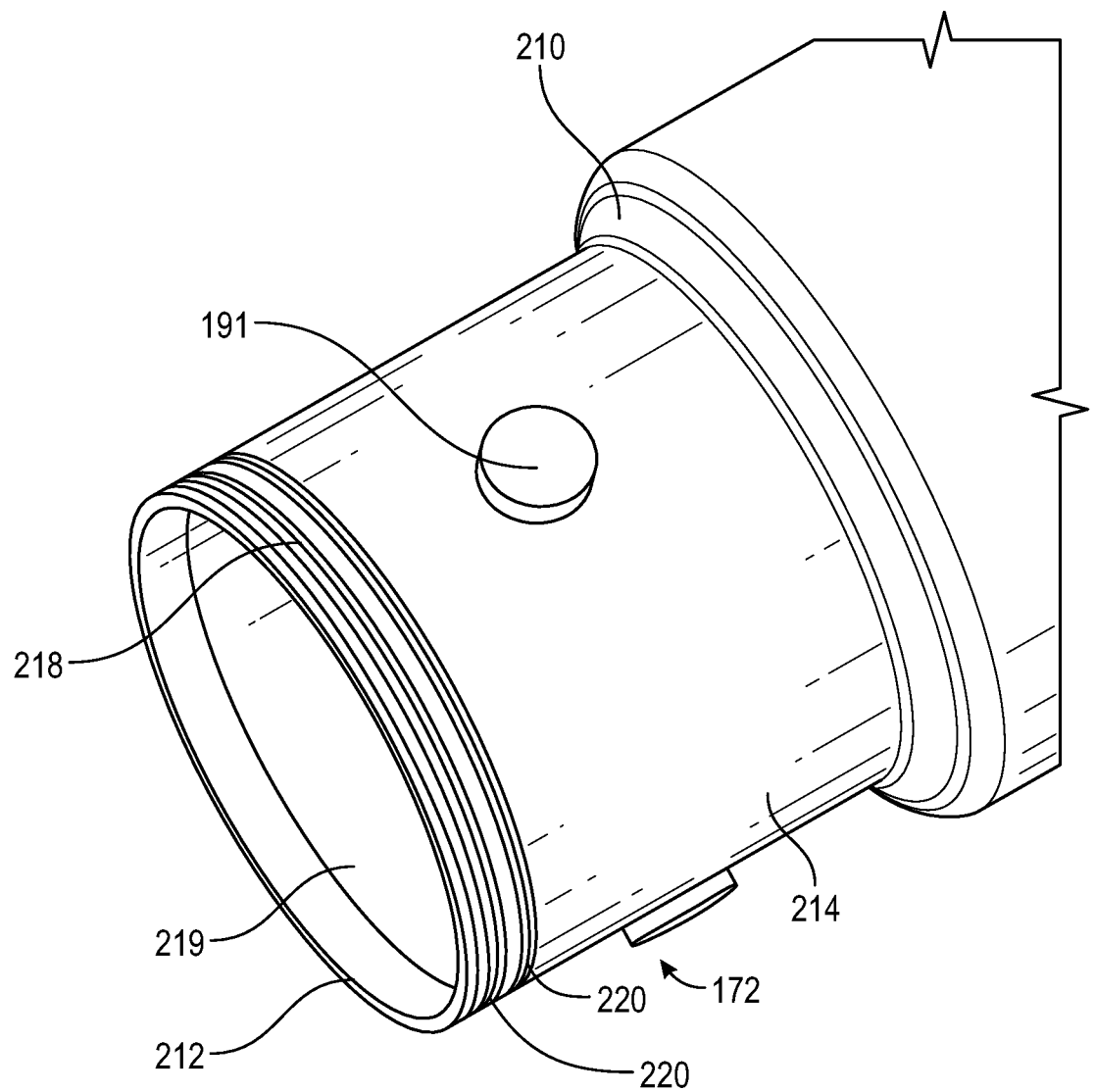
FIG. 7 is another form of a male connector for the metering system of FIG. 2.

Turning now to FIG. 7, another form of a male connector 172 is illustrated. Male connector 172 is similar to male connector 72 in many aspects, unless noted otherwise. The male connector 172 is configured for assembly with the female connector 170. The male connector 172 includes a first end 210 opposite a second end 212. The male connector 172 has an outer surface 214 that includes one or more external tabs 191 near the first end 174 or near a mid-portion of the male connector 172. There are a corresponding number of external tabs 191 as there are grooves 190. The external tabs 191 are configured to engage the grooves 190 to retain the male connector 172 to the female connector 170 to form a seal when the male connector 172 is assembled with the female connector 170. In the illustrated form, there are three external tabs 191 and three grooves 190. The external tabs 191 are sized and shaped to slide along the first groove portion 190 as the first end 174 of the female connector 70 is pushed onto the second end 212 of the male connector 172. The external tab 191 is substantially round but could be shaped differently in other embodiments. As the female connector 170 is rotated about the male connector 172, the external tab 191 slides from the first groove portion 190 along the second groove portion 196. The female connector 170 is then pushed further onto the male connector 172 and the external tab 191 slides along the third groove portion 198.

The male connector 172 also includes a plurality of threads 218 at or near the second end 212 wherein the plurality of threads 218 are sized to retain one or more O rings or other types of sealing members 220 for engaging the inside surface 192 of the female connector 170 to form a seal. Other types of sealing members 220 can include double lip, triple lip, or wiper seals, to name a few. One of ordinary skill in the art would appreciate that other types of sealing members not specifically mentioned can be used as well. The male connector 172 also includes an inside surface 219 having an inside diameter to fluidly connect with a primary tube 250 as described below.

Figure 8:
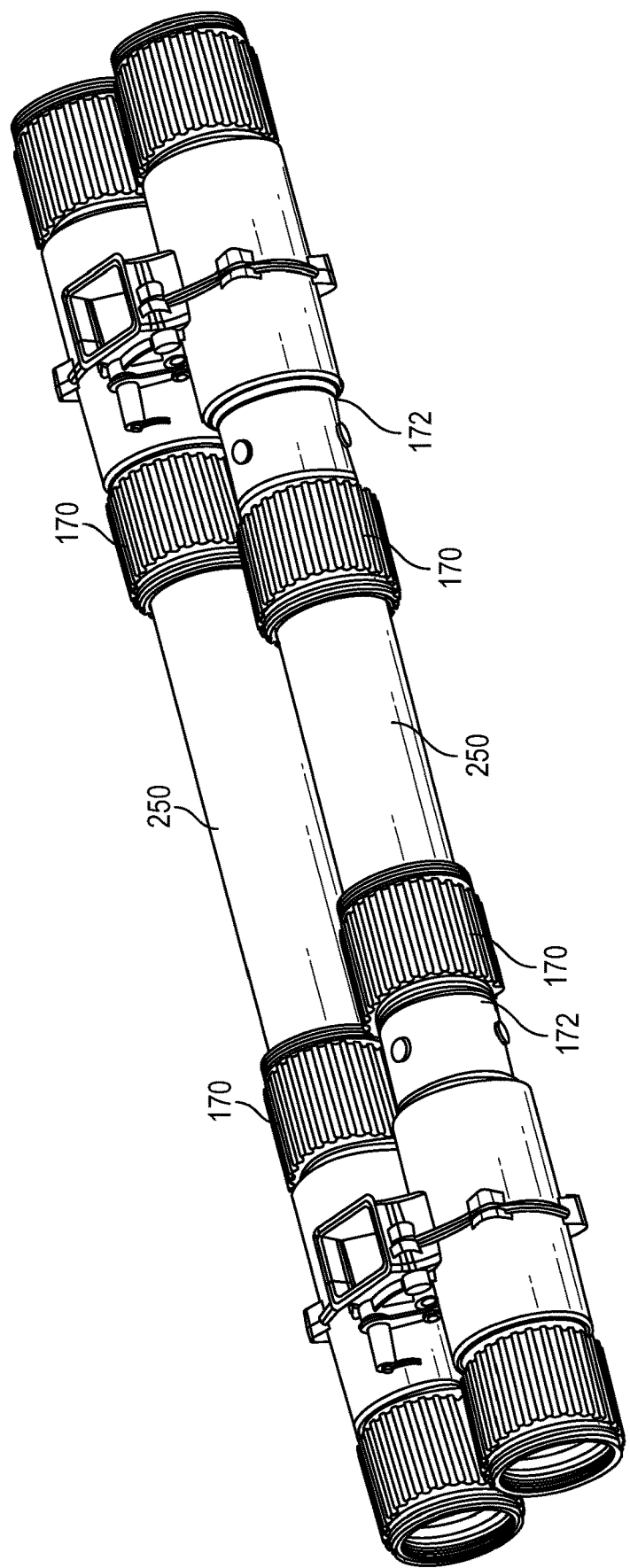
FIG. 8 is a side perspective view of the female connector of FIG. 6 in an assembly state with the male connector of FIG. 7 along with a primary tube installed between the male and female connectors.

Turning now to FIG. 8, two of the female connectors 170 are assembled with two of the male connectors 172 with a primary tube 250 therebetween in the first embodiment. Although the female connector 170 and male connector 172 are illustrated, it is possible that the female connector 70 and the male connector 72 can be used. The primary tube 250, the female connectors 170, and the male connectors 172 have a combined total length when assembled to span between two manifolds 52.

Figure 9:
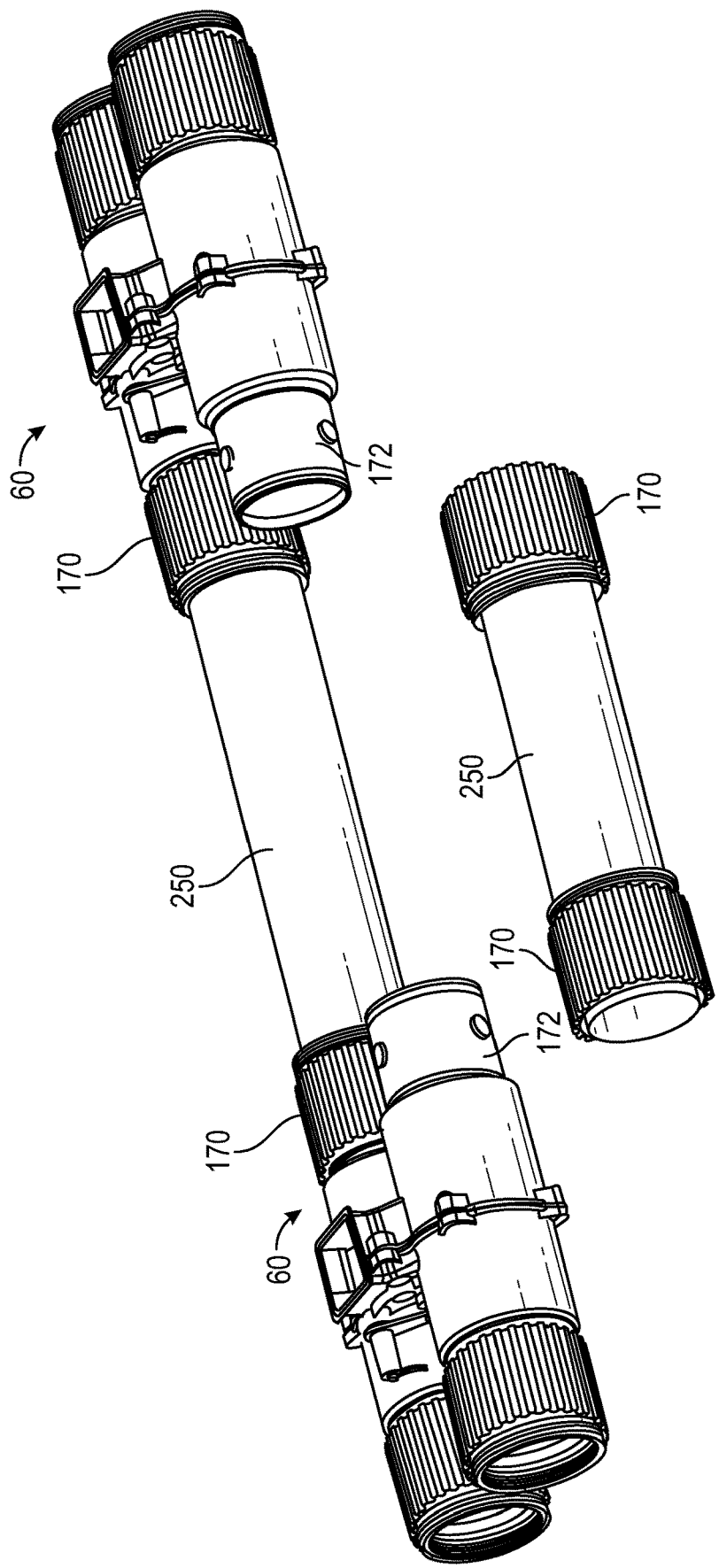
FIG. 9 is a side perspective view of the FIG. 8 embodiment with the female connector and primary tube in an unassembled configuration from the male connector.

The primary tube 250 includes an outside engagement mechanism configured to assemble with the second internal retention mechanism 97 of the female connector 70 to fluidly connect the primary tube 250 to the male connector 72. In the second embodiment, the two female connectors 170 have been unassembled or disassembled from the male connectors 172 with the primary tube 250 therebetween. To remove the two female connectors 170, the connectors 170 are rotated and then slid inboard or towards each other on the primary tube 250. In FIG. 9, the primary tube 250 along with the two female connectors 170 are removed from the male connectors 172 to expose the inside diameter or inside surface 219 of the male connectors 172. Beneficially by exposing the inside surface 219 of the male connectors 172 enables unplugging of any material that has plugged the air lines.

The steps are reversed to re-assemble the primary tube 250, the female connectors 170, and the male connector 172. First the primary tube 250 and female connectors 170 are aligned with the male connectors 172. Next the female connectors 170 are pushed onto the male connectors 172 until the external tab 191 slides along the first groove portion 190 to the second groove portion 196. The female connector 170 is then rotated such that the external tab 191 slides along the second groove portion 196. The female connector 170 is then pushed further onto the male connector 172 and the external tab 191 slides along the third groove portion 198.

Figure 10:
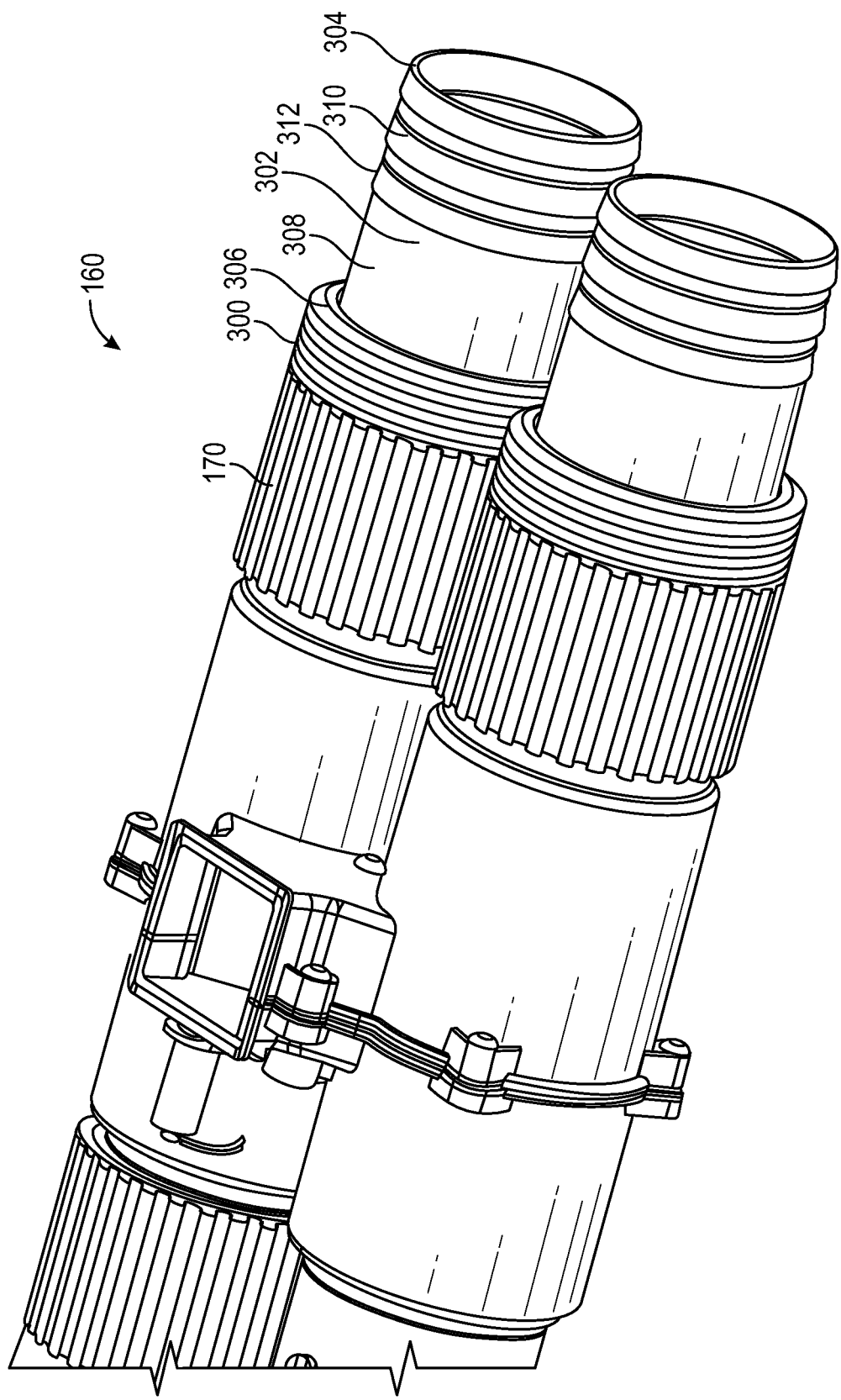
FIG. 10 is a side perspective view of one embodiment of a female connector, a locking ring, and a barbed fitting for connection with a flexible hose.

FIG. 10 is a side perspective view of one embodiment of another embodiment of a fluid line connection 160 including the female connector 170 assembled with a locking ring 300 and a barbed fitting connector 302. The barbed fitting connector 302 is configured to retain a flexible hose thereon (not illustrated). In the illustrated embodiment, the barbed fitting connector 302 includes a first end 304 opposite a second end 306 and a length that spans between the first and second ends 304 and 306. The barbed fitting connector 302 has an outer surface 308 that includes a plurality of engagement features 310 near the first end 304. In other forms, the engagement features 310 can be placed near the mid-portion of the barbed fitting connector 302. The plurality of engagement features 310 include a plurality of threads 312. The second end 306 including a portion of the barbed fitting connector 302 is received in the female connector 170.

The locking ring 300 is configured to attach to the female connector 170 and retain the barbed fitting connector 302 with the female connector 170. In particular, the locking ring 300 includes a plurality of threads (not illustrated) on an interior diameter that are configured to threadingly engage the plurality of threads 197 of the female connector 170 to retain the locking ring 300 on the female connector 170. The locking ring 300 can be configured differently in other embodiments to connect with the female connector 170 and retain the barbed fitting connector 302 to the female connector 170.

Figure 11:
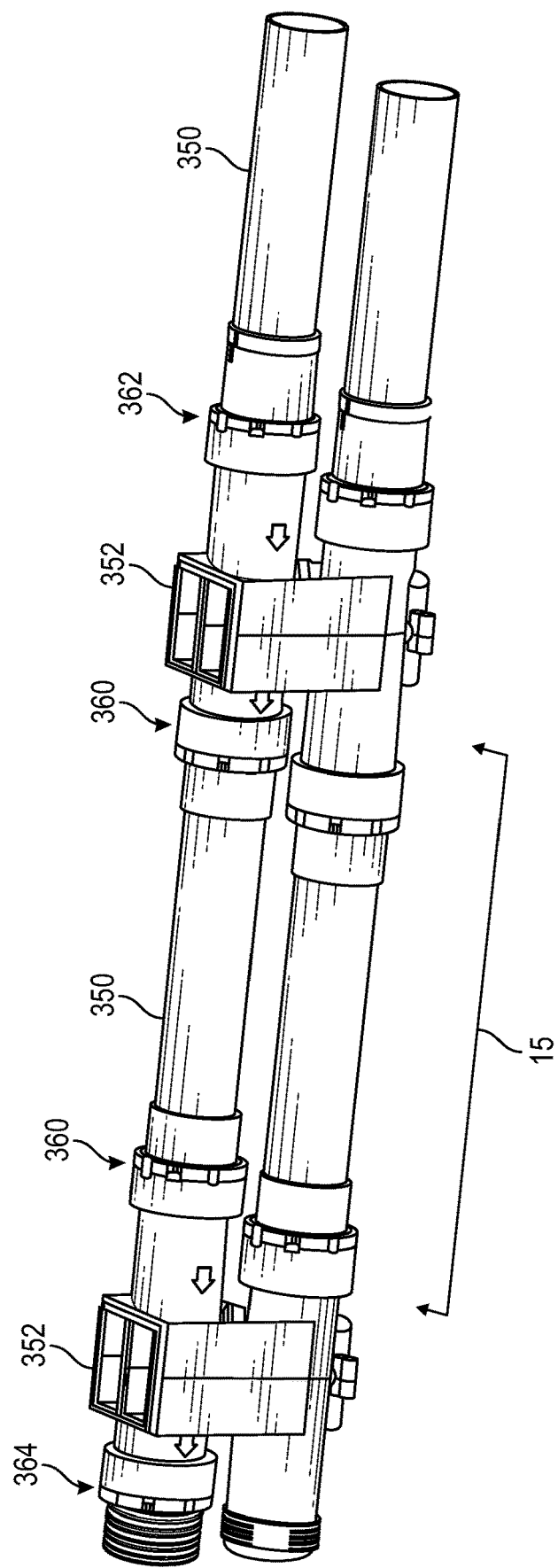
FIG. 11 is a side perspective view of another form of an exemplary metering system of the air seeder of FIG. 1.

Turning now to FIG. 11, additional forms of fluid line connections 360, 362, and 364 are illustrated. Each of a conveyance or primary tube 350 extends to and terminates at each of the fluid line connections 360 and 362 for coupling with a manifold 352. Each of a flexible conveyance or primary hose or tube extends to and terminates at each of the fluid line connections 364 for coupling with the manifold 352. The conveyance or primary tubes 350 that extend between the fluid line connections 360 cannot travel axially and are trapped between the respective manifolds 352. The conveyance or primary tubes 350 that extend between the fluid line connections 362 can travel axially between the respective manifolds 352. Further details regarding the connectivity between the conveyance or primary tubes 350 and the fluid line connections 360 and 362, and flexible conveyance or primary hose or tubes and the fluid line connections 364, are discussed below.

Figure 12:
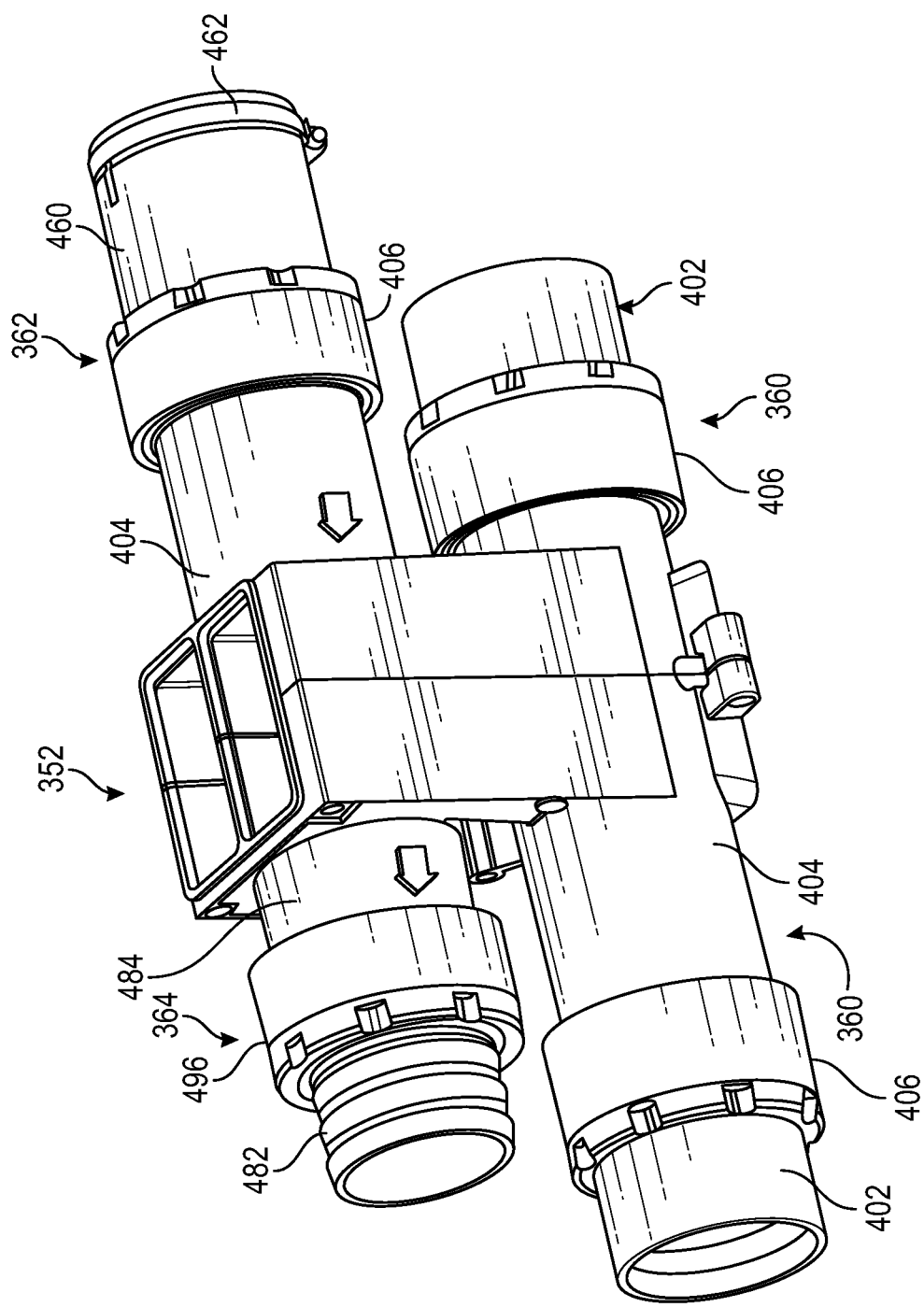
FIG. 12 is a side perspective view of a manifold with fluid line connections assembled therewith.

FIG. 12 includes the manifold 352 with the fluid line connections 360, 362, and 364 assembled therewith for illustrative purposes. In an assembled configuration for operation of the agricultural vehicle, the manifold 352 would include the same type of fluid connections for a single side as illustrated in FIG. 11.

Figure 13:
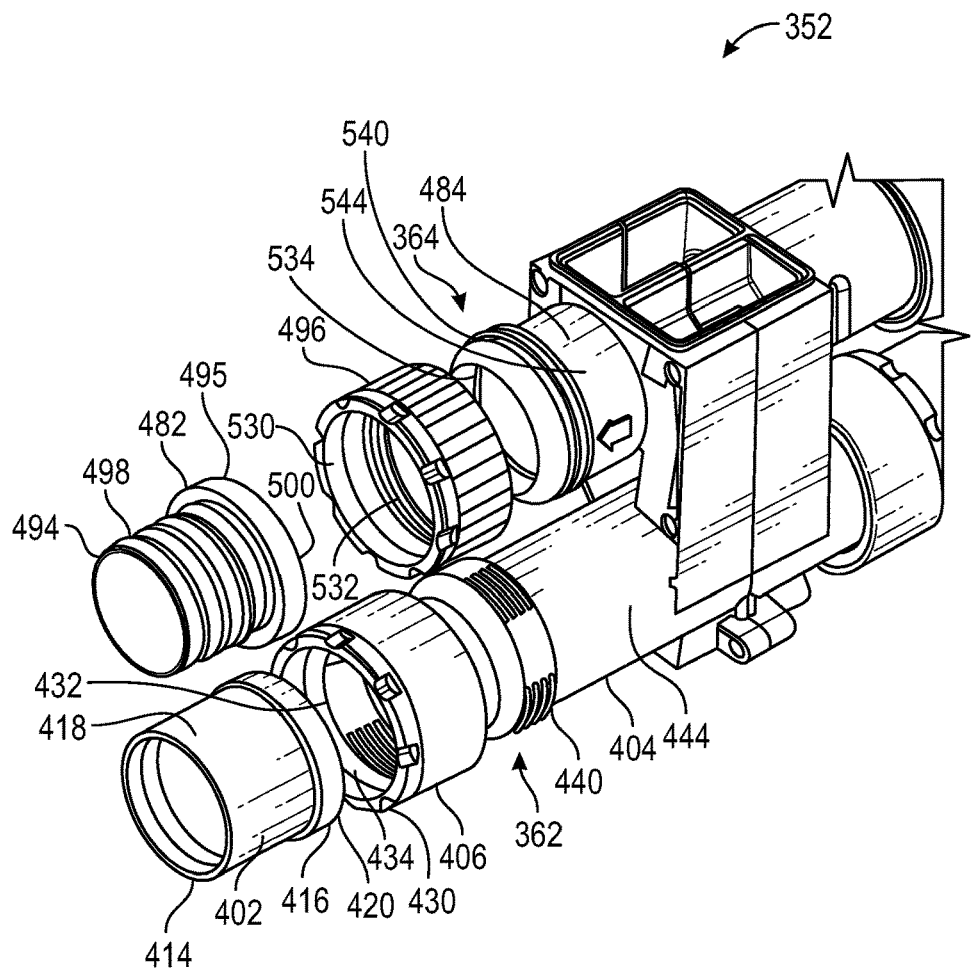
FIG. 13 is a partial side perspective view of the manifold with fluid line connections of the FIG. 12 embodiment.

The fluid line connection 360 includes a fitting connector 402, a male connector 404 (illustrated in FIG. 13), and a locking ring 406 that are assembled together. The fitting connector 402 is assembled with the locking ring 406, and thereafter the assembled fitting connector 402 and locking ring 406 is assembled onto the male connector 404 such as being rotatingly assembled with the male connector 404.

The fitting connector 402 is a tube configured to receive the conveyance or primary tube or hose 350 therein (not illustrated) and retain the conveyance or primary tube or hose 350 between the respective manifolds 352. In the illustrated embodiment, the fitting connector 402 includes a first end 414 opposite a second end 416 and a length that spans between the first and second ends 414 and 416. The fitting connector 402 has a smooth outer surface 418 that includes an engagement feature or lip 420 near the first end 414. The engagement feature or lip 420 is a ring that extends around the outer surface 418 and is sized fit within the locking ring 406.

The locking ring 406 is configured to attach to the male connector 404 and retain the fitting connector 402 with the conveyance or primary tube 350. The locking ring 406 includes a plurality of threads 430 on an interior surface 432 that are configured to threadingly engage a plurality of threads 440 of the male connector 404 to retain the locking ring 406 on the male connector 404. The plurality of threads 430 extend for a portion of the circumference of the interior surface 432 wherein the interior surface 432 has a smooth surface or wall between two groups of the plurality of threads 430. As such, the plurality of threads 430 are intermittent threads. The length of the plurality of threads 430 corresponds to the length of a plurality of threads 440 on the male connector 404 to matingly engage one another. The locking ring 406 can be configured differently in other embodiments to connect with the male connector 404. The locking ring 406 includes a receiving portion 434 on the interior surface 432 that is sized to receive the engagement feature or lip 420 of the fitting connector 402 therein.

The male connector 404 can be a part of or monolithic with the manifold 352, or can be a separate part that is attached to the manifold 352 in another embodiment. The male connector 404 includes a plurality of threads 440 that extend for a portion of the circumference of an exterior surface 444. The plurality of threads 440 can include a full thread or partially thread configuration as illustrated in FIG. 14.

Figure 14:
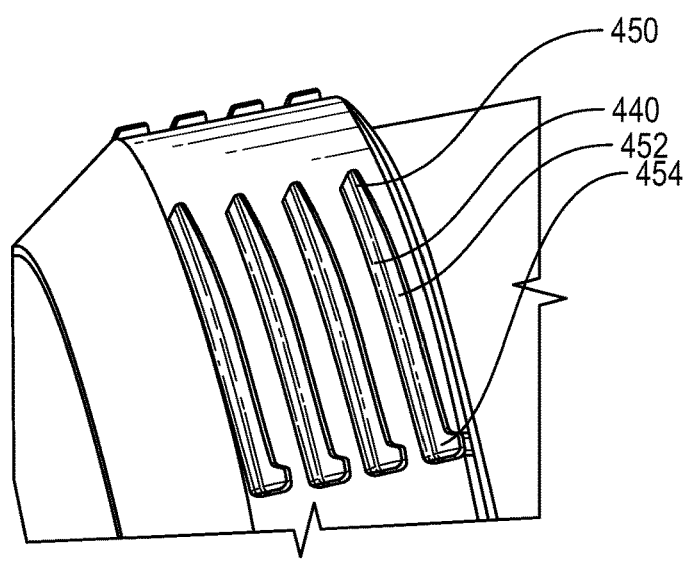
FIG. 14 is a partial side perspective view of a male connector of the manifold of the FIG. 13 embodiment.
Figure 15:
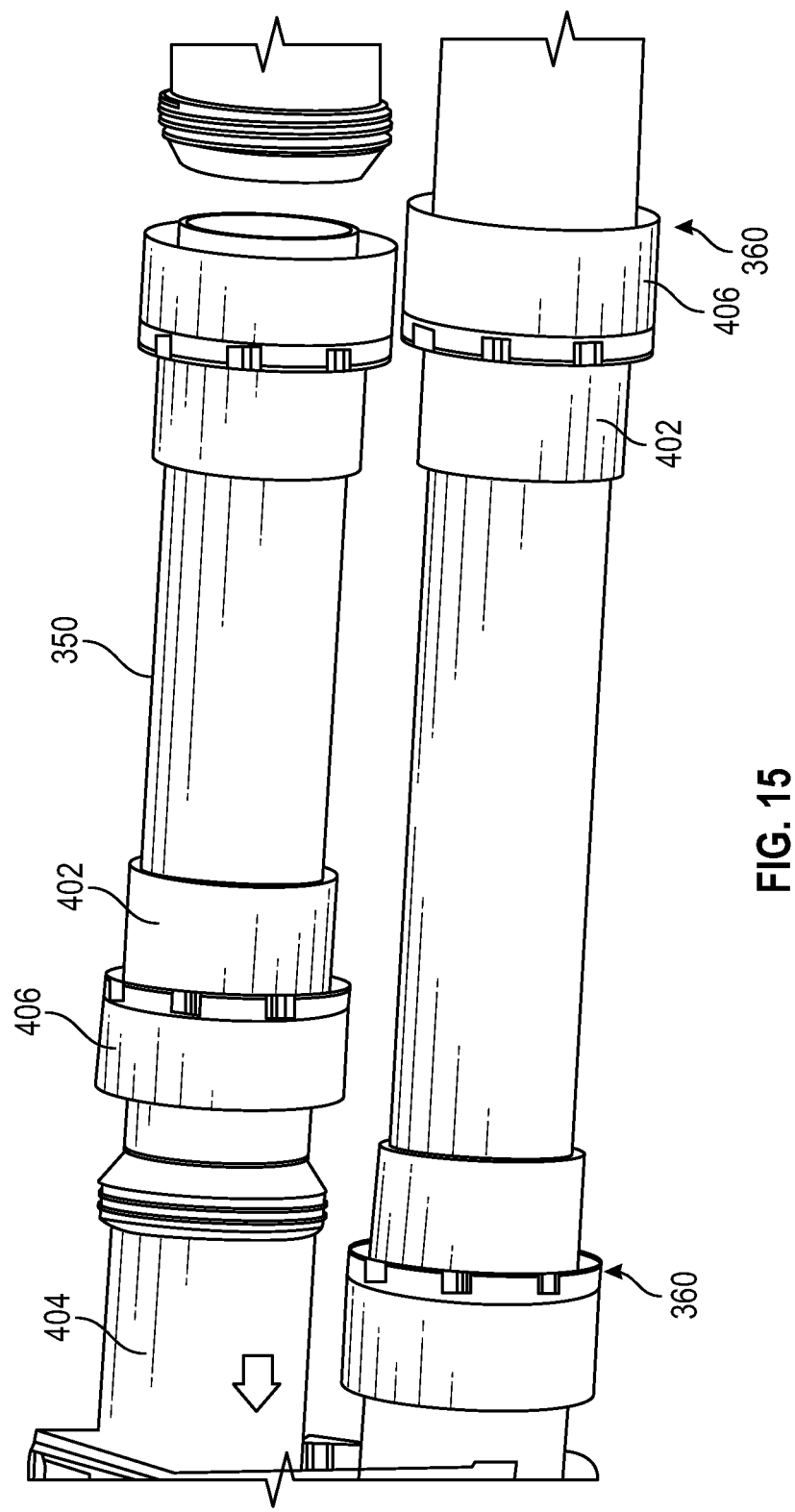
FIG. 15 is a partial side perspective view of metering system of the FIG. 11 embodiment.

FIG. 14 illustrates one form of the plurality of threads 440. In this form, each of the plurality of threads 440 includes a ramp portion 450, a planar portion 452, and a stop portion 454. The ramp portion 450 extends to the planar portion 452, and the planar portion 452 extends to the stop portion 454. The ramp portion 450 is a tapered portion as compared to the planar portion 452 of the threads 440. The stop portion 454 extends perpendicularly to the planar portion 452. As the locking ring 406 is rotated about the male connector 404, the plurality of threads 434 engage and slide along the ramp portions 450 of the plurality of threads 440. As the locking ring 406 continues to rotate about the male connector 404, the plurality of threads 434 engage and start to slide along the planar portions 450 until ends of the plurality of threads 434 reach the stop portions 454 of the threads 440 which thereby limit movement or rotation of the locking ring 406 about the male connector 404.

To assemble the fluid line connection 360, the engagement feature or lip 420 of the fitting connector 402 is inserted into the receiving portion 434 of the locking ring 406. The fitting connector 402 and locking ring 406 slide onto or receive the conveyance or primary tube 350 between a pair of manifolds 352. The opposite end portion of the conveyance or primary tube 350 is received similarly with another fitting connector 402 and another locking ring 406. The locking ring 406 rotates about the male connector 404 such that the plurality of threads 430 engage the plurality of threads 440 to retain the locking ring 406 onto the male connector 404 and the fitting connector 402 and conveyance or primary tube 350 therewith. To fully assemble the locking ring 406 onto the male connector 404, the rotation of the locking ring 406 is between about 30 to 90 degrees, and in one form about 60 degrees. After assembly, the conveyance or primary tube 350 cannot move axially due to being trapped between the pair of manifolds 352.

To disassemble the fluid line connection 360, the locking ring 406 rotates about the male connector 404 such that the plurality of threads 430 disengage from the plurality of threads 440. The locking ring 406 and the fitting connector 402 slide along the conveyance or primary tube 350 to disengage from the male connector 404. The conveyance or primary tube 350 with the locking ring 406 and the fitting connector 402 can then be removed from the male connector 404. The locking ring 406 and the fitting connector 402 can then slid off or otherwise removed from the conveyance or primary tube 350.

Illustrated in FIG. 12, is the fluid line connection 362 which includes a split end connector 460, a male connector 404, and a locking ring 406 that are assembled together. The split end connector 460 is assembled with the locking ring 406, and thereafter the assembled split end connector 460 and locking ring 406 are assembled onto the male connector 404 such as being rotatingly assembled with the male connector 404.

The split end connector 460 includes a clamp or other mechanism 462 to retain the conveyance or primary tube 350 with the split end connector 460. The split end connector 460 is configured to receive a portion of the conveyance or primary tube 350 therein. The split end connector 460 has a length that is sufficient to support and constrain the conveyance or primary tube 350 from axial or bending movement however the conveyance or primary tube 350 can travel axially.

To assemble the fluid line connection 362, the split end connector 460 is inserted into the receiving portion 434 of the locking ring 406. The split end connector 460 and locking ring 406 slide onto or receive the conveyance or primary tube 350 between the pair of manifolds 352. The opposite end portion of the conveyance or primary tube 350 is received similarly with another split end connector 460 and another locking ring 406. The locking ring 406 rotates about the male connector 404 such that the plurality of threads 430 engage the plurality of threads 440 to retain the locking ring 406 onto the male connector 404 and the split end connector 460 and the conveyance or primary tube 350 therewith. To fully assemble the locking ring 406 onto the male connector 404, the rotation of the locking ring 406 is between about 30 to 90 degrees, and in one form about 60 degrees. The clamp mechanism 462 is engaged to retain the conveyance or primary tube 350 in the split end connector 460. After assembly, the conveyance or primary tube 350 can move axially between the pair of manifolds 352.

To disassemble the fluid line connection 362, the clamp mechanism 462 is released and the locking ring 406 rotates about the male connector 404 such that the plurality of threads 430 disengage from the plurality of threads 440. The locking ring 406 and the split end connector 460 slide along the conveyance or primary tube 350 to disengage from the male connector 404. The conveyance or primary tube 350 with the locking ring 406 and the split end connector 460 can then be removed from the male connector 404. The locking ring 406 and the split end connector 460 can then slide off or otherwise be removed from the conveyance or primary tube 350.

The fluid line connection 364 includes a fitting connector 482, a male connector 484 (illustrated in FIG. 13), and a locking ring 496 that are assembled together. The fitting connector 482 is assembled with the locking ring 496, and thereafter the assembled fitting connector 482 and locking ring 496 is assembled onto the male connector 484 such as being rotatingly assembled with the male connector 484.

The fitting connector 482 is a tube configured to receive the conveyance or primary tube or hose 350 therein (not illustrated) and retain the conveyance or primary tube or hose 350 between the respective manifolds 352. In the illustrated embodiment, the fitting connector 482 includes a first end 494 opposite a second end 495 and a length that spans between the first and second ends 494 and 495. The fitting connector 482 has a barbed or ribbed outer surface 498 that extends to an engagement feature or lip 500 near the first end 494. The barbed or ribbed outer surface 498 is configured to receive and retain an end of a flexible hose thereon. The engagement feature or lip 500 is a ring that extends around the outer surface 498 and is sized fit within the locking ring 496.

The locking ring 496 is configured to attach to the male connector 484 and retain the fitting connector 482 with the conveyance or primary tube 350. The locking ring 496 includes a plurality of threads 530 on an interior surface 532 that are configured to threadingly engage a plurality of threads 540 of the male connector 484 to retain the locking ring 496 on the male connector 484. The plurality of threads 530 extend around the circumference of the interior surface 532. The length of the plurality of threads 530 corresponds to the length of a plurality of threads 540 on the male connector 484 to matingly engage one another. The locking ring 496 can be configured differently in other embodiments to connect with the male connector 484. The locking ring 496 includes a receiving portion 534 on the interior surface 532 that is sized to receive the engagement feature or lip 520 of the fitting connector 482 therein.

The male connector 484 can be a part of or monolithic with the manifold 352, or can be a separate part that is attached to the manifold 352 in another embodiment. The male connector 484 includes a plurality of threads 540 that extend around the circumference of an exterior surface 544. The plurality of threads 540 are a fully threaded configuration but may be a partially threaded configuration in other embodiments such as the plurality of threads 440.

To assemble the fluid line connection 364, the engagement feature or lip 500 of the fitting connector 482 is inserted into the receiving portion 532 of the locking ring 496. The fitting connector 482 and locking ring 496 slide onto or receive an end portion of the conveyance or primary tube 350 between a pair of manifolds 352. The opposite end portion of the conveyance or primary tube 350 is received similarly with another fitting connector 482 and another locking ring 496. The locking ring 496 rotates about the male connector 484 such that the plurality of threads 530 engage the plurality of threads 540 to retain the locking ring 496 onto the male connector 484 and the fitting connector 482 and conveyance or primary tube 350 therewith to fully assemble the locking ring 496 onto the male connector 484. Rotation of the locking ring 496 can be between 360 degrees or less and 1080 degrees of turning to lock the locking ring 496 onto the male connector 484. After assembly, the conveyance or primary tube 350 cannot move axially due to being trapped between the pair of manifolds 352.

To disassemble the fluid line connection 364, the locking ring 496 rotates about the male connector 484 such that the plurality of threads 530 disengage from the plurality of threads 540. The locking ring 496 and the fitting connector 482 slide along the conveyance or primary tube 350 to disengage from the male connector 484. The conveyance or primary tube 350 with the locking ring 496 and the fitting connector 482 can then be removed from the male connector 484. The locking ring 496 and the fitting connector 482 can then slide off or otherwise be removed from the conveyance or primary tube 350.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A fluid line connection for a pneumatic distribution system for an agricultural air seeder, the fluid line connection comprising:
   a female connector having an inside diameter with a groove having a first groove portion that extends along a longitudinal axis of the female connector;
   a male connector configured for internal assembly with the female connector, the male connector having an engagement mechanism configured to engage the groove and retain the male connector to the female connector to form a seal when the female connector is rotatingly assembled with the male connector; and
   a primary tube removably coupled to the male connector through the female connector, the primary tube being separable from the female connector;
   wherein the groove includes a locking feature, and an external tab includes a receiver configured to retain the locking feature therein.

2. The fluid connection of claim 1, wherein the groove includes a second groove portion that extends laterally from the first groove portion.

3. The fluid connection of claim 2, wherein the groove includes a third groove portion that extends along the longitudinal axis to connect with the second groove portion.

4. The fluid connection of claim 1, wherein the external tab includes a ramp groove configured to guide the locking feature into the receiver when the female connector is assembled with the male connector.

5. The fluid connection of claim 1, wherein the female connector has an outer surface that includes a plurality of engagement features.

6. The fluid connection of claim 1, wherein the engagement mechanism on the male connector comprises the external tab.

7. The fluid connection of claim 1, further comprising:
   a fitting connector configured to retain the primary tube thereon, the fitting connector configured for assembly with the female connector; and
   a locking ring configured to attach to the female connector and retain the fitting connector with the female connector.

8. The fluid connection of claim 7, wherein the female connector and the locking ring each include a plurality of threads to threadingly engage each other.

9. The fluid connection of claim 1, wherein
   the primary tube has an outside diameter configured to assemble with the inside diameter of the female connector.

10. The fluid connection of claim 1, further comprising:
    a sealing member positioned on an outer surface of the male connector, wherein the sealing member is configured to engage and form a second seal with the inside diameter of the female connector.

11. The fluid connection of claim 1,
    wherein the female connector includes a second internal retention mechanism opposite the groove; and
    wherein the primary tube has an outside engagement mechanism configured to assemble with the second internal retention mechanism of the female connector to fluidly connect the primary tube to the male connector.

12. A fluid line connection for a pneumatic distribution system for an agricultural air seeder, the fluid line connection comprising:
    a female connector having an inside diameter that has grooves defined therein;
    a male connector configured for assembly with the female connector, the male connector having an external tab configured to engage the grooves and retain the male connector to the female connector to form a seal when the male connector is assembled with the female connector;
    a fitting connector configured to retain a primary tube thereon, a portion of the fitting connector coupled to the female connector; and
    a locking ring configured to attach to the female connector and retain the fitting connector with the female connector;
    wherein the grooves includes a first groove portion that extends along a longitudinal axis of the female connector to connect with a second groove portion that extends laterally from the first groove portion;
    wherein the second groove portion includes a locking feature, and the external tab includes a receiver configured to retain the locking feature therein.

13. The fluid connection of claim 12, wherein the female connector and the locking ring each include a plurality of threads to threadingly engage each other.

* * * * *